(12) United States Patent
Hellhake et al.

(10) Patent No.: US 11,533,689 B2
(45) Date of Patent: *Dec. 20, 2022

(54) SYSTEM AND METHOD FOR CONTROLLING DYNAMIC TRANSMIT POWER IN A MESH NETWORK

(71) Applicant: Rajant Corporation, Malvern, PA (US)

(72) Inventors: Paul Hellhake, Coatesville, PA (US);
David Acker, Malvern, PA (US);
William Jordan, Ephrata, PA (US)

(73) Assignee: RAJANT CORPORATION, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,946

(22) Filed: Jun. 23, 2020

(65) Prior Publication Data
US 2020/0322895 A1    Oct. 8, 2020

Related U.S. Application Data

(63) Continuation of application No. 14/956,024, filed on Dec. 1, 2015, now Pat. No. 10,694,473.

(51) Int. Cl.
*H04W 52/24* (2009.01)
*H04W 52/38* (2009.01)
(Continued)

(52) U.S. Cl.
CPC ....... *H04W 52/241* (2013.01); *H04W 52/383* (2013.01); *H04W 52/143* (2013.01); *H04W 52/286* (2013.01); *H04W 84/18* (2013.01)

(58) Field of Classification Search
CPC ............... H04W 52/24; H04W 52/241; H04W 52/0245; H04W 52/245; H04W 52/246;
(Continued)

(56) References Cited

U.S. PATENT DOCUMENTS

| | | |
|---|---|---|
| 6,418,137 B1 | 7/2002 | Bontu |
| 7,949,060 B2 | 5/2011 | Ling |

(Continued)

FOREIGN PATENT DOCUMENTS

WO    WO-2013127699 A1    9/2013

OTHER PUBLICATIONS

Distributed power control in ad-hoc wireless networks. In Personal, Indoor and Mobile Radio Communications, 2001 12th IEEE International Symposium on (vol. 2, pp. F-F). IEEE. (Retrieved on Mar. 15, 2017). Retrieved from the Internet:<http://citeseerx.ist.psu.edu/viewdoc/download?doi=10.1.1.23.2831&rep=rep1&type=pdf>Agarwal S et al. Sep. 30, 2001 (Sep. 30, 2001) section II E.

(Continued)

*Primary Examiner* — Un C Cho
*Assistant Examiner* — Lalita W Pace
(74) *Attorney, Agent, or Firm* — Blank Rome LLP

(57) ABSTRACT

A system and method for controlling dynamic transmit power in a mesh network are disclosed. Distributed power transmit management methodology that implements transmission power management based on a comparison of signal to noise ratios from received beacon packets is used on a peer-to-peer basis. Embodiments work to keep all nodes accessible, dynamically adaptable to constant changes in the network, maximize frequency reuse, and reduce power requirements to maximize network performance while minimizing interference.

16 Claims, 7 Drawing Sheets

(51) Int. Cl.
*H04W 84/18* (2009.01)
*H04W 52/14* (2009.01)
*H04W 52/28* (2009.01)

(58) Field of Classification Search
CPC ........... H04W 52/247; H04W 52/0209; H04W 52/0225; H04W 52/383; H04W 52/143; H04W 52/286; H04W 84/18; H04W 52/36
See application file for complete search history.

(56) References Cited

U.S. PATENT DOCUMENTS

| | | | |
|---|---|---|---|
| 7,983,230 | B1 | 7/2011 | Li |
| 2002/0071395 | A1 | 6/2002 | Redi |
| 2004/0266469 | A1* | 12/2004 | Hayashi ............... H04W 52/16 455/522 |
| 2006/0050698 | A1 | 3/2006 | Aytur |
| 2006/0093026 | A1 | 5/2006 | Montojo |
| 2006/0159030 | A1 | 7/2006 | Strutt |
| 2006/0253736 | A1 | 11/2006 | Rudolf et al. |
| 2008/0285522 | A1 | 11/2008 | Ma et al. |
| 2010/0111199 | A1 | 5/2010 | Sharma |
| 2010/0240373 | A1 | 9/2010 | Ji |
| 2011/0170431 | A1 | 7/2011 | Palanki et al. |
| 2013/0107758 | A1* | 5/2013 | Waheed ............ H04W 52/0245 370/256 |
| 2013/0157651 | A1 | 6/2013 | Khaitan |
| 2014/0086157 | A1* | 3/2014 | Bontu ................ H04W 52/383 370/329 |
| 2014/0254459 | A1 | 9/2014 | Gelal |
| 2015/0223257 | A1* | 8/2015 | Wilhelmsson ........ H04W 76/14 455/452.1 |
| 2016/0262111 | A1* | 9/2016 | Boudreau ............. H04W 76/10 |

OTHER PUBLICATIONS

A Multi-channel MAC Protocol with Power Control for Multi-hop Mobile Ad Hoc Networks. The Computer Journal 45, No. 1 (2002).( Retrieved on Mar. 15, 2017). Retrieved from the Internet: <https://pdfs.semanticscholar.org/5377/f41407cbfc364656b60cdf23c6112ef07a10.pdf> Wu, Shih-Lin et al. Jan. 1, 2002 (Jan. 1, 2002) sub-section 2.2. ,Section 3.

Dynamic data rate and transmit power adjustment in IEEE 802.11 wireless LANs. International Journal of Wireless Information Networks, 12(3), pp. 123-145. (Retrieved on Mar. 12, 2017). Retrieved from the Internet:<http://citeseerx.ist.psu.edu/viewdoc/download?doi=10.1.1.404.5870&rep=rep1&type=pdf> Chevillat, P. et al. Jul. 3, 2005 (Jul. 3, 2005) p. 124 left col. lines 1-4, 14 -19, line 48—right col. line 5.

* cited by examiner

SYSTEM AND METHOD FOR CONTROLLING DYNAMIC TRANSMIT POWER IN A MESH NETWORK

CROSS-REFERENCE TO RELATED APPLICATIONS

This application is a continuation of U.S. patent application Ser. No. 14/956,024 filed on Dec. 1, 2015, the content of which is incorporated by reference herein.

FIELD OF INVENTION

The present invention concerns tactical and mobile communications networks, and more specifically, Mobile Ad Hoc Networks (MANET). Such networks are distinguished by their ability to self-organize and heal connections, as radio nodes enter and leave each other's direct communications ranges with minimal impact to the performance of other nodes on the network.

BACKGROUND OF THE INVENTION

In traditional radio systems, it is usually the goal of a transmitter to run as loudly as possible in order to maximize transmit distance. Some radio systems, such as cellular systems, use feedback between tower and client devices to minimize the transmit power needed by the client, primarily to extend the battery life of a mobile client.

In a peer-to-peer mobile mesh network, however, power management becomes exponentially more complex as many radio nodes may be in motion, moving within and out of radio signal ranges and are subject to differing spatial, climatic, topographical and other influencers. Traditionally, it has been necessary to have at least one node in a system transmitting loudly enough so that all nodes in the system are able to remain in the network due to the requirement to have a centralized or master node to manage the network. But transmitting too loudly will create interference for some nodes that can overwhelm nearby mesh nodes, waste power, and leave the nodes unable to remain in the network. And when scaling to very large node counts (e.g., into the hundreds of individual nodes), a mesh network needs to take advantage of frequency reuse, i.e., when different parts of the network independently use the same frequencies without interference. In addition, in a highly mobile mesh network, nodes are moving relative to each other most of the time, so that power control has to dynamically adapt to a constantly changing network. The present disclosure defines a distributed power transmit management methodology that implements transmission power management on a peer-to-peer basis, and thereby keeps all nodes accessible, dynamically adapts to changes in the network, maximizes frequency reuse, and reduces power requirements to maximize network performance while minimizing interference.

SUMMARY OF THE INVENTION

Embodiments are directed to a method for controlling dynamic transmit power in a mesh network, the mesh network having a plurality of nodes. The method comprises: (a) receiving a packet at a receiver of one of the nodes; (b) determining whether the received packet is a beacon packet; (c) determining a signal-to-noise ratio (SNR) of the received packet, when the received packet is determined to be a beacon packet; (d) comparing the SNR to a predetermined range; (e) determining whether the SNR falls within or outside the predetermined range based on the SNR comparison; (f) determining a transmit power level adjustment value, when the SNR is determined to fall outside the predetermined range; and (g) adjusting, at a transmitter of the node, the transmit power level based on the transmit power level adjustment value, wherein the adjusted transmit power level is used by the transmitter for transmitting a non-beacon packet.

In an embodiment, the method further includes determining a frequency band to be used by the transmitter for transmitting the non-beacon packet, wherein determining the frequency band is based on at least one criteria selected from the group consisting of the adjusted transmit power level, the transmit power level adjustment value, the SNR comparison, and combinations thereof.

In an embodiment, at least one of the steps (b)-(e) is performed by the receiver.

In an embodiment, determining the transmit power level adjustment value is performed by the receiver.

In an embodiment, the method further includes sending, via the receiver, the transmit power level adjustment value to the transmitter.

In an embodiment, the beacon packet is transmitted at full power.

In an embodiment, the SNR is a current SNR and is added to a previous SNR exponential moving average based on a previous SNR to create a current SNR exponential moving average, and wherein the SNR comparison utilizes the current SNR exponential moving average.

In an embodiment, the method further includes providing an SNR report based on the current SNR to a mesh protocol when the change in SNR ($\Delta$SNR) from the previous SNR to the current SNR is greater than or equal to a decibel threshold.

In an embodiment, the mesh protocol is utilized in determining the transmit power level adjustment value.

In an embodiment, the mesh protocol utilizes a low SNR limit, a high SNR limit, and either the $\Delta$SNR or both the previous SNR and the current SNR.

BRIEF DESCRIPTION OF THE DRAWINGS

The detailed description will refer to the following drawings, wherein like reference numerals refer to like elements, and wherein.

DETAILED DESCRIPTION OF THE INVENTION

Figure 1:
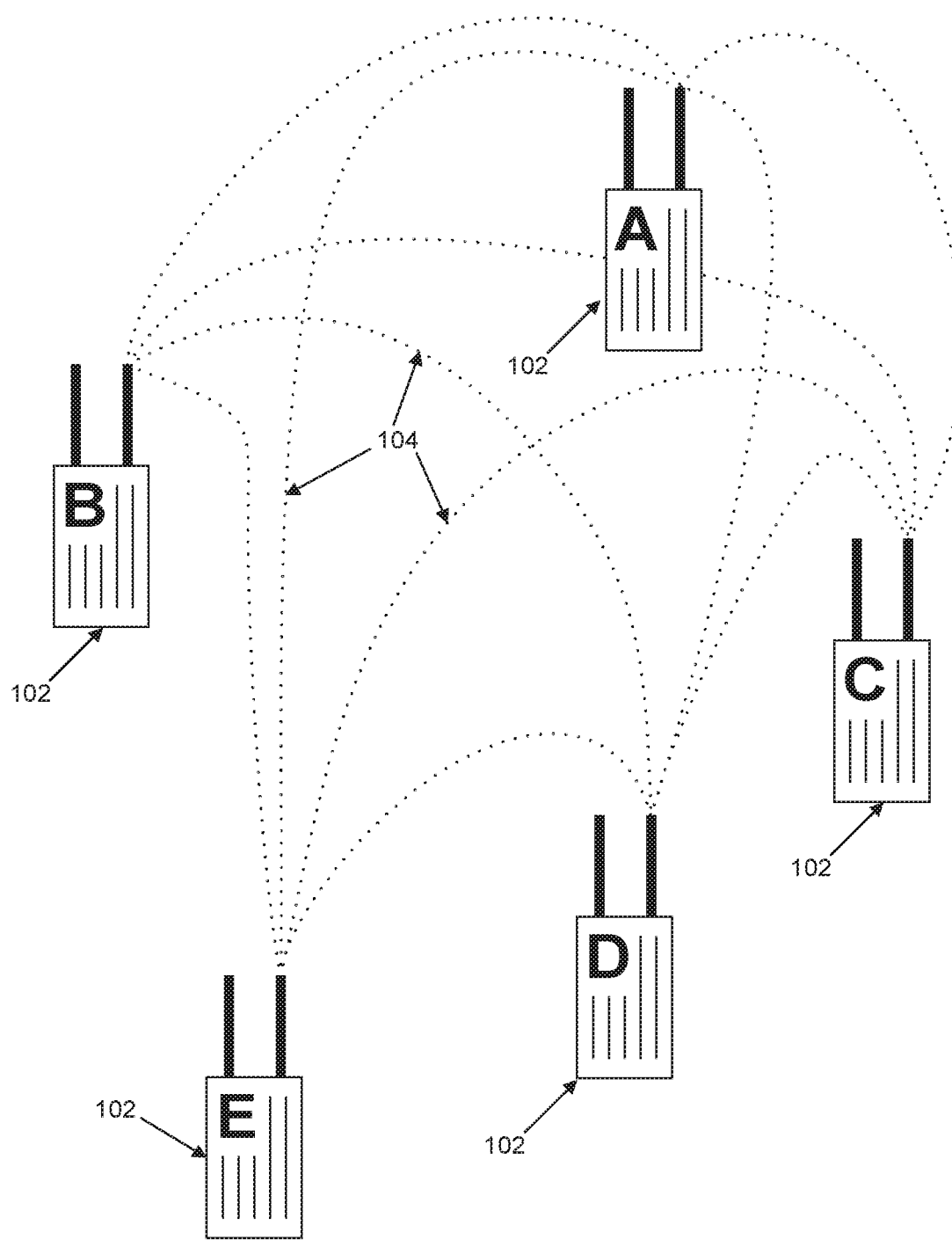
FIG. 1 is a diagram illustrating a prior art mobile mesh network, showing exemplary connections between the various radio nodes.

It is to be understood that the figures and descriptions of the present invention may have been simplified to illustrate elements that are relevant for a clear understanding of the present invention, while eliminating, for purposes of clarity, other elements found in a typical radio/node or mesh network, or typical method of using, controlling, or operating a node or mesh network. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Transmit power control is presently a highly desirable feature in many kinds of mobile radio systems. Most current radio systems have the ability to scale transmit power, but lack any high level means of knowing what power levels are ideal, aside from the technician's input in designing and deploying the network infrastructure. Historically, power levels are statically set by a technician knowledgeable in the art of designing and deploying a network. Even when a qualified experienced technician deploys a network, a myriad of external factors such as weather, topography, moving assets, and fluctuating power can influence and change a network's performance during its use or during future use. At the hardware level, power adjustments are a cooperative process between transmitter and receiver, with the receiver(s) informing the transmitter of their ability to receive in some useful way. Dynamic transmit power monitors and adjusts the transmit settings on a, for example, continual basis many times per second to accommodate all the variables in a given network to optimize performance, reduce power consumption, and deliver reliable communications.

The present disclosure describes improved systems and methods for handling transmit power control across a dynamic digital radio network. In each such network, a series of microcomputer-based networking devices (i.e., network radios/nodes) communicate with one another. Each of these network nodes will receive messages from other nodes, and will transmit or relay messages on to additional nodes. A goal of this invention is to manage output power in transmitting radios to balance reliability with network congestion, increase the ability to reuse the same radio band within the network, and deal effectively with transmission nodes at varying distances from one another.

In some classic radio topologies, a transmitting radio usually operates at full volume. In simple radio systems, this may be sufficient, but this methodology has limitations. High transmit power may likely overwhelm close radios. Constant full power operation may also be a waste of power, a particularly critical issue for mobile radio units.

In a mesh radio network, as found in a preferred embodiment of this invention, there are expected to be many radio units, each radio unit often functioning as both transmitter and receiver at different times or simultaneously, usually capable of transmitting on two or more radio bands separately or simultaneously, and the radio units are often in constant motion relative to one another. These criteria create problems that are particularly important to solve to make an optimal radio mesh.

In the preferred embodiment of the invention, the network is a dynamic mesh network, which has to effectively manage both very dense and very sparse network configurations while accounting for all of the factors that influence connectivity, such as weather, distance, interference, and network density. The density of the network at any given node is defined by the number of nodes that can be directly accessed by that node, i.e., that node's neighbors. In an active mesh network, nodes can be constantly moving or influenced by environmental and topographic factors. This can break direct links from a node to its neighbors, and introduce new, directly-linked neighbors, as nodes are repositioned.

The basic architecture of a mobile mesh radio is illustrated in FIG. 1. FIG. 1 schematically illustrates a prior art mobile mesh network 100, showing exemplary connections between the various radio nodes. The mobile mesh network consists of multiple digital radio nodes 102, each based on a computer management and routing system coupled with one or more digital radios operating simultaneously on different radio channels/bands. In the ideal case, every radio in the network, each of A, B, C, D, E in the example, can communicate with every other radio in the network via connections 104. However, the point of a mesh network is that network data packets for any radio in the mesh can be delivered by any radio in the mesh. Thus, if radio A were not able to deliver a packet to radio E in the mobile mesh network 100, radio A's packet could be routed through radios B, C, or D. The effectiveness of any given radio mesh algorithm is based on how efficiently these packets can be routed to radios over the whole network and how well the algorithm can deal with specific problems and issues that can occur in a large and constantly changing network.

Figure 2A:
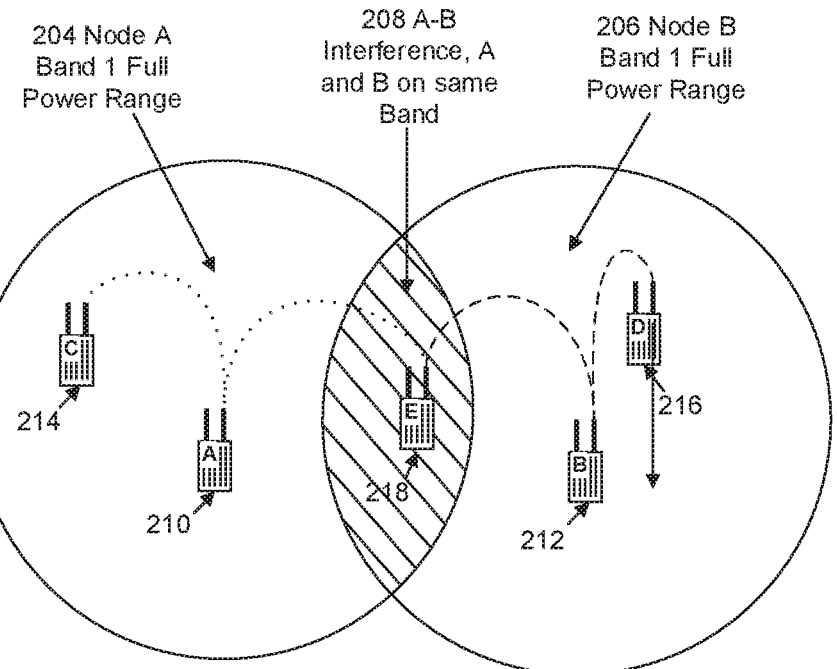
FIG. 2A is a diagram illustrating frequency interference between nodes at full power in a prior art mobile mesh network.
Figure 2B:
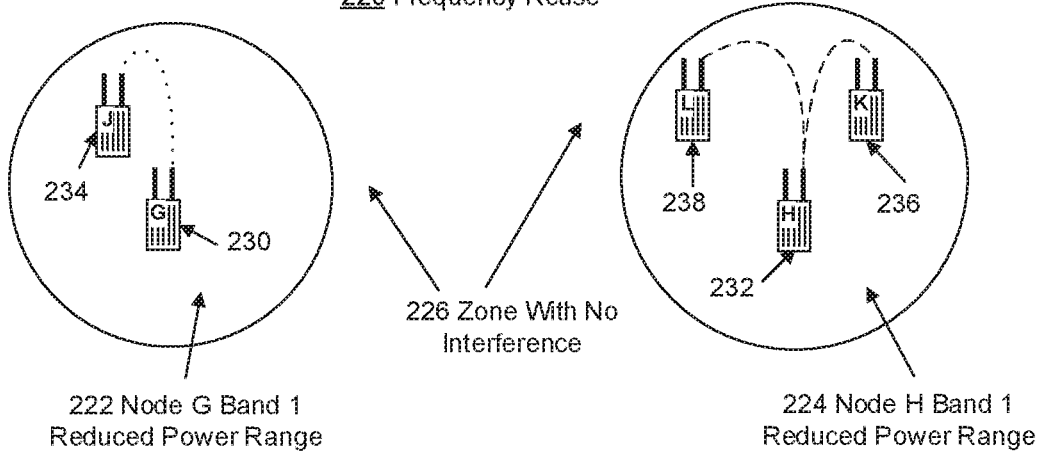
FIG. 2B is a diagram illustrating frequency reuse between nodes at reduced power in a prior art mobile mesh network.

Some of these issues are illustrated in a prior art mobile mesh network shown in FIGS. 2A and 2B, which respectively and schematically depict Frequency Interference 202 and Frequency Reuse 220. These are two possible cases in a large network with a limited number of radio channels. In the case of Frequency Interference 202 (FIG. 2A), there are two mesh radio nodes currently transmitting, i.e., node A 210 and node B 212, both transmitting at full power on the same radio Band 1. Node A transmits in a zone with range 204 which includes node C 214 and node E 218. Node B transmits in a zone with range 206 which includes node D 216 and node E 218. In this fixed scenario, node C will be able to receive from node A, and node D will be able to receive from node B. But node E, while covered by both nodes A and B, resides in intersection area 208, will receive from neither node A nor node B, as the transmissions from node A and node B will interfere with each another.

The solution to this problem is the concept of frequency reuse. FIG. 2B illustrates frequency reuse between nodes at reduced power in a prior art mobile mesh network. In the same radio mesh, the same radio band will be re-used many times in shorter range hops that only include some of the radios in the mesh. In the case of Frequency Reuse 220, node G 230 transmits at a lower power level in a zone with range 222, so node G's transmission will be received only by node J 234. Similarly, node H 232 transmits at a lower power level in a zone with range 224, so node H's transmission can be received only by node K 236 and node L 238. Thus, by lowering the transmission power of node A (in FIG. 2A) so as to include node C within node A's range, and node B so as to include node D and node E within node B's range, node B would be capable of reaching node E (which is slightly closer to node B than node A) without the interference from node A that was found in the first example. Likewise, with lower transmission power, a zone of non-interference 226 will exist between zone 222 and zone 224 within the same overall network shown in FIG. 2B.

This may seem like a simple problem in the examples given, but once a mesh network is established with hundreds of constantly moving nodes, the ability to re-use the same radio bands over the extent of the mesh network becomes critical, and the dynamic transmit power management/control described in the present disclosure is one of the key components to optimizing this performance.

Figure 3:
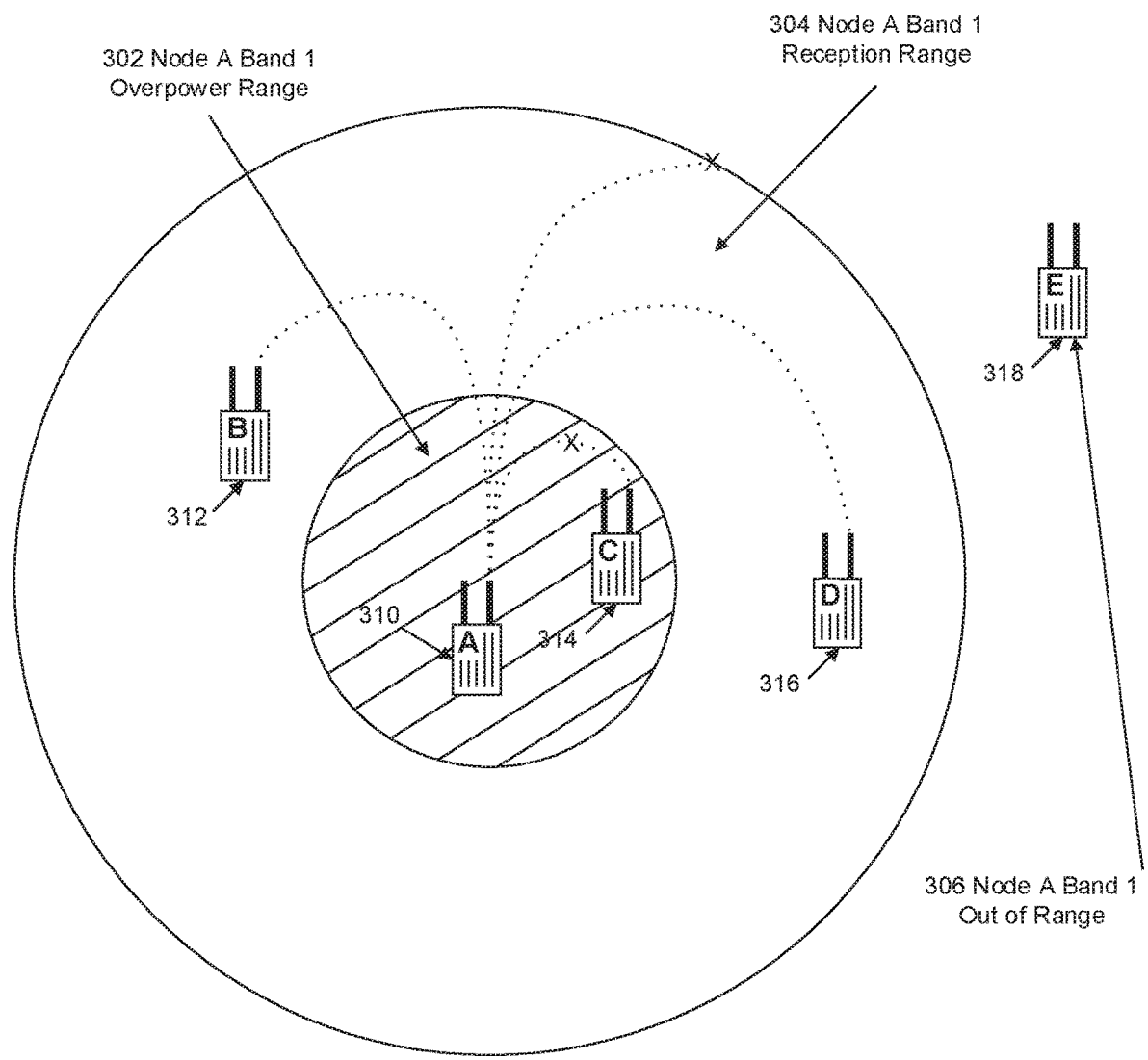
FIG. 3 is a diagram illustrating near and far failures in a prior art mobile mesh network utilizing a node transmitting at constant full power.

Another problem is shown in FIG. 3 which illustrates near and far failures 300 in a prior art mobile mesh network utilizing a node transmitting at constant full power. In a radio network with a node A 310 set to transmit always at full power, there are three regions of interest. Very close to that node, there's an overpowering zone 302. Node C 314 resides in that zone. The signal from node A overwhelms the input circuitry of node C's receiver and no data is received. Node B 312 and node D 316 are in a zone within the normal reception range 304 of node A and have no problem receiving data from node A. However, node E 318 is in a zone 306 which is too far, even at node A's full power transmission, to hear the transmission from node A, so like node C, node E will not be included in any network traffic from node A.

Figure 4:
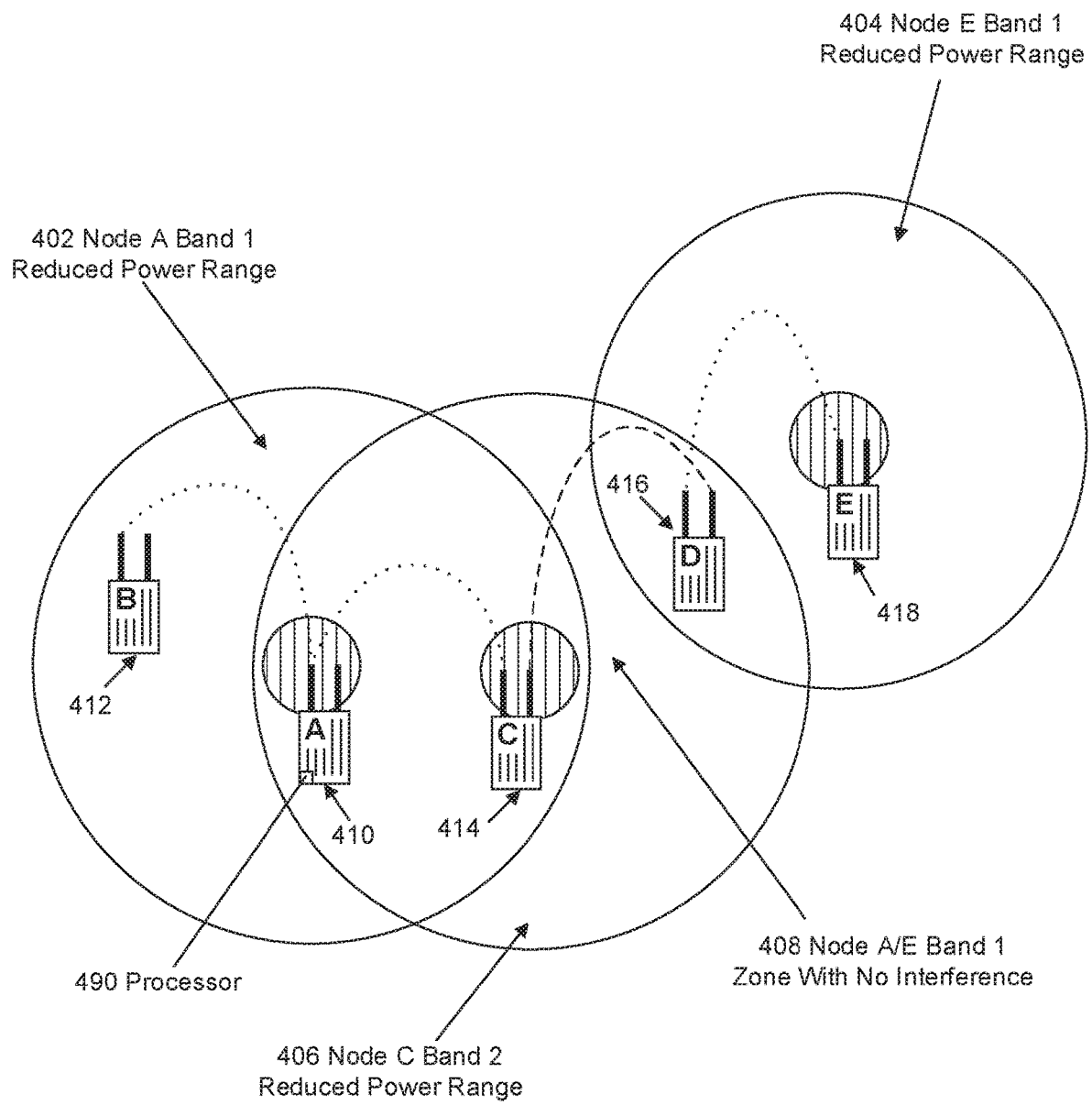
FIG. 4 is a diagram illustrating dynamic transmit power by space in a mobile mesh network utilizing nodes transmitting at reduced power via multiple bands.

A solution using dynamic transmit power management and the system's mesh capability is shown in FIG. 4 which illustrates dynamic transmit power by space 400 in a mobile mesh network utilizing nodes transmitting at reduced power via multiple bands. In this example, node A 410 has reduced its power output on band 1 (resulting in zone A's transmission in a zone with range 402), allowing both node B 412 and node C 414 to hear node A's transmission. At the time that node A is transmitting to node B and/or node C, node D 416 and node E 418 cannot hear node A's transmission. However, node C is close enough to reach node D using band 2 with its second radio in a zone with range 406, at reduced transmit power. Node E 418 cannot hear node C, but at the same instant, node E (having a transmission zone with range 404) can reach node D by reusing band 1 again. Node E's transmission range on band 1 with power reduced does not overlap with node A's transmission range 402, thereby creating a zone 408 of no interference between node A's range 402 and node E's range 404. Alternatively, node D may transmit data using band 1 to node E with reduced power that would not overlap with node A's transmission range 402 simultaneously using band 1.

It may still be desirable for node A 410 to directly communicate with node D 416 when there is a unicast packet at node A to be delivered to node D. In another embodiment, some or all power adjustments may be made on a node-to-node basis. As such, high-powered connections may still be made and will usually be made for broadcast and other system packet transfers, but the high-powered connections are minimized.

Figure 5A:
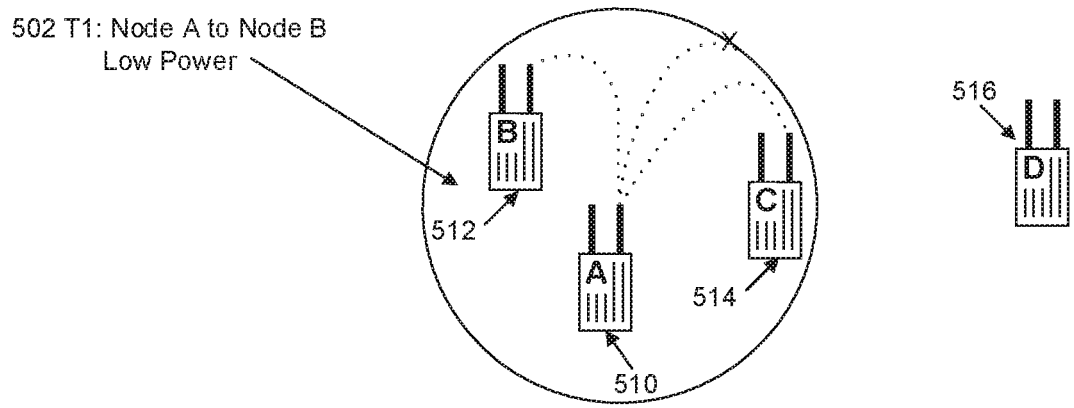
FIG. 5A is a diagram illustrating dynamic transmit power by time in a mobile mesh network utilizing a node transmitting at low or lower/reduced power.
Figure 5B:
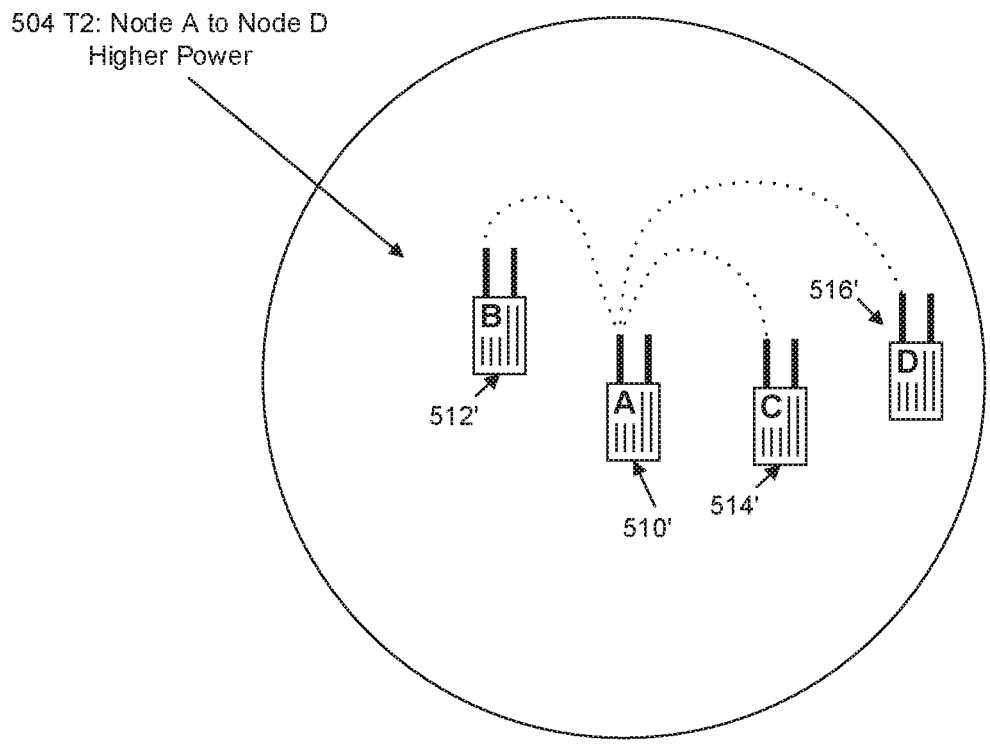
FIG. 5B is a diagram illustrating dynamic transmit power by time in a mobile mesh network utilizing a node transmitting at high or higher/increased power.

A similar radio location configuration is shown in FIGS. 5A and 5B. FIG. 5A illustrates dynamic transmit power by time 500 in a mobile mesh network utilizing a node transmitting at low or lower/reduced power. At time T1 502, node A 510 is unicasting to node B 512. This is based on the predicted transmission power level for that node-to-node connection, which is also sufficient to reach node C 514, but will not involve node D 516, potentially allowing node D to reuse the same radio band. Later, at time T2 504 shown in FIG. 5B which illustrates dynamic transmit power by time 501 in a mobile mesh network utilizing a node transmitting at high or higher/increased power, node A 510' is unicasting to node D 516', which requires a higher power. This signal would also be seen by node B 512' and node C 514', preventing or interfering with reuse of that radio band at the same time. Given the complex nature of the constantly changing network topology in a mobile mesh network, it is impractical for every node to track the position, channels in use, and power of every other node. Another goal of this invention is to use only the power necessary for each node-to-node link, which will ensure that no node is using more power for a point-to-point link than necessary for that link, thus maximizing both connectivity, frequency reuse, and economy of power in the mobile mesh network.

The basis for power determination starts at any receiver, which will track the SNR (signal to noise ratio) of special network "beacon" packets, which are usually sent at full power. The low level drive code for each receiver will track these SNR levels and notify a higher level network component(s) (e.g., transmitter or transmitter driver) when changes might be needed.

A set of limits on low and high SNR define the ideal operation of the receiver. As long as received full power beacon packets fall into that range, the link will be at the correct receive levels. When received full power beacon packets fall above or below the defined range of operation, a new power level reduction is calculated based on the changed SNRs, within bounded limits set by the system. When the saved power level adjustment changes, the receiver will send the new power decrement to the transmitter, which will update its transmission power levels based on that changed level. In a practical mesh system, this process is repeated between any combination of transmitting and receiving nodes on a continual or periodic basis, thus reacting to movement and other changing conditions in the radio mesh network. Alternatively, the frequency of the process may be dependent on other factors such as weather, network density, topography, network density, distance between nodes, or locations of nodes.

Figure 6:
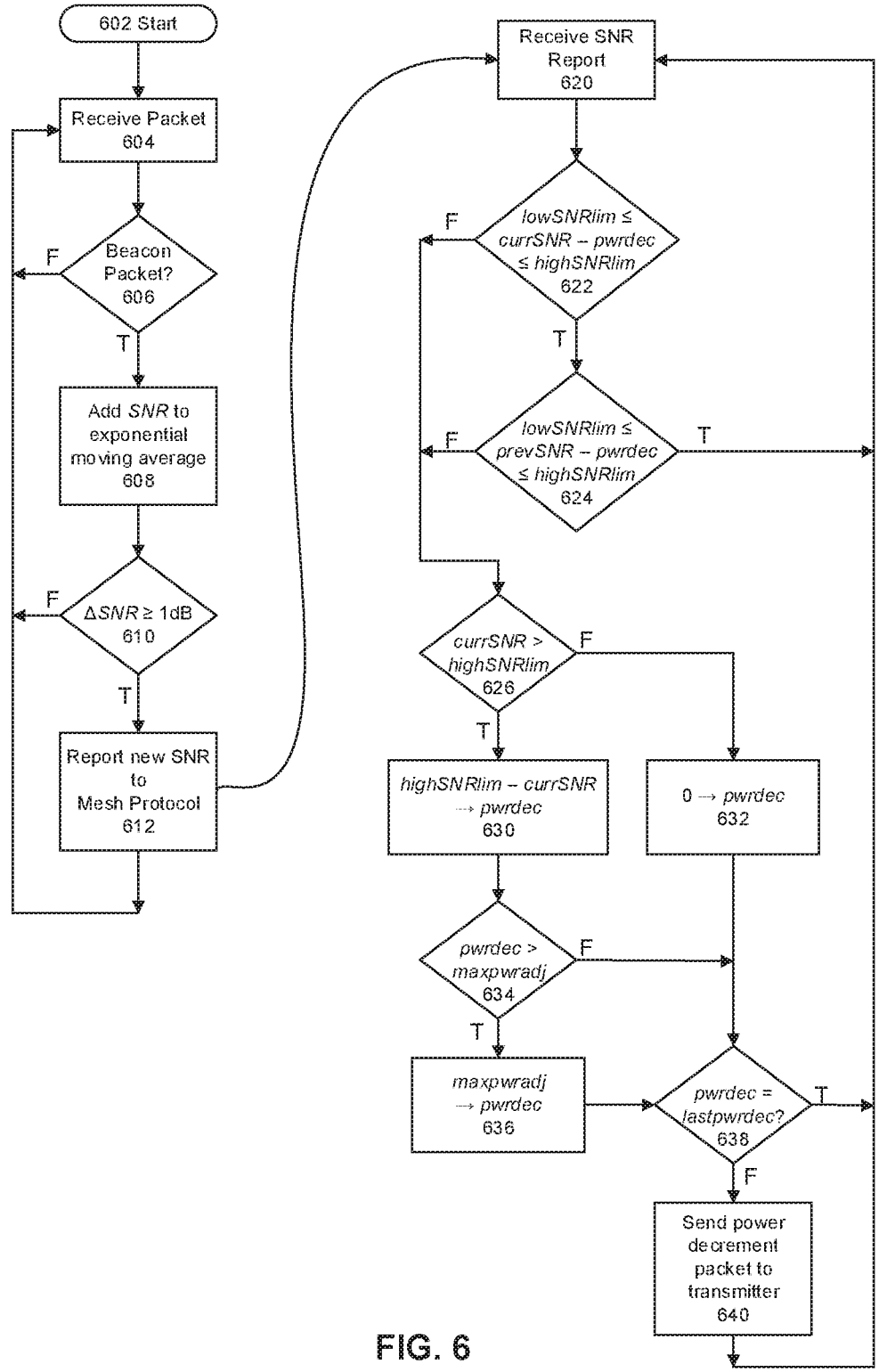
FIG. 6 is a flowchart illustrating an embodiment of a receive-side dynamic transmit power process for nodes within a mobile mesh network.

In an embodiment, the process used by any node's receive-side is shown in FIG. 6 which is a flowchart illustrating an embodiment of a receive-side dynamic transmit power process 600 for nodes within a mobile mesh network. Much of the tuning takes place at the receiver, since the goal of the transmit power management is to ensure a reliable connection driven with as little power as possible. The process starts (block 602) in the low-level device driver of the receiving device. When a packet is received (block 604), it's checked for type to determine whether the packet is a beacon packet (block 606). If the packet is not a beacon packet, the process waits for the next packet. If the packet is a beacon packet—which is usually at full power—the measured SNR of that packet is added to an exponential moving average of received SNR (block 608). The change in SNR (ΔSNR) since the last report is checked (comparison 610). If the ΔSNR is less than, for example, 1 dB, no action is taken. Otherwise, if the ΔSNR is greater than or equal to 1 dB, the change in SNR or new/current SNR is provided (e.g., reported) to the mesh protocol/layer (block 612), and this driver process (i.e., blocks 604-612) goes back to waiting for the next packet (block 604).

The mesh protocol accesses (e.g., receives) an SNR report (block 620), and looks at some system variables. The system defines a lower SNR limit (lowSNRlim), a high SNR limit (highSNRlim), the active power decrement value (pwrdec), and both current (currSNR) and previous (prevSNR) signal-to-noise ratios. There may optionally be a limit on the amount of power adjustment (max pwradj). If the lowSNRlim is less than or equal to currSNR−pwrdec, which is turn is less than or equal to highSNRlim (comparison 622), and lowSNRlim is less than or equal to prevSNR−pwrdec and in turn is less than or equal to highSNRlim (comparison 624), no action is taken. If either of those conditions are not met, currSNR is compared to highSNRlim (comparison 626). If currSNR exceeds highSNRlim, pwrdec is set to currSNR−highSNRlim (block 630). If that sets pwrdec higher than max pwradj (comparison 634), pwrdec is set to max pwradj (block 636), limiting the range of adjustment. If currSNR is less than or equal to highSNRlim, pwrdec is set to zero (block 632).

After the adjustment, the new pwrdec is compared to the previous one (comparison 638). If they are the same, no further action is taken, and the process is complete. If they are not equal, the node sends a power decrement packet to the target peer (block 640).

Figure 7:
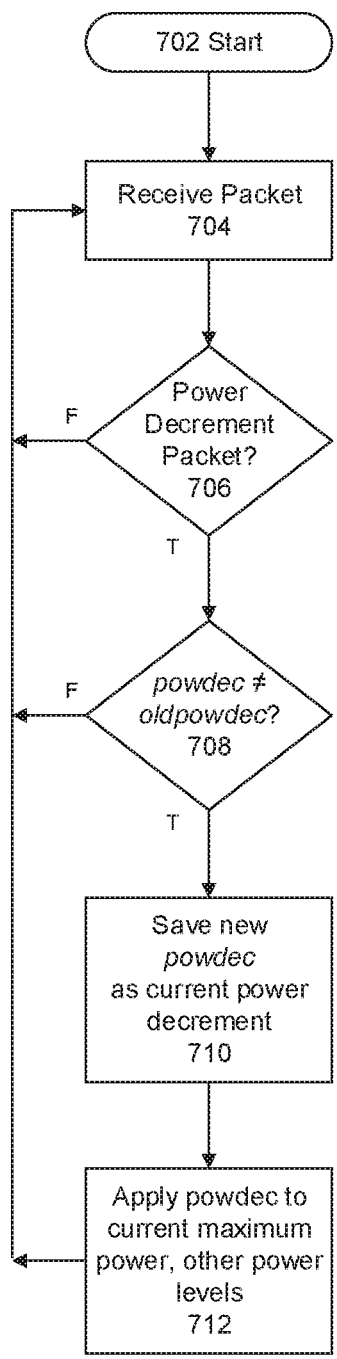
FIG. 7 is a flowchart illustrating an embodiment of a transmit-side dynamic transmit power process for nodes within a mobile mesh network.

FIG. 7 is a flowchart illustrating an embodiment of a transmit-side dynamic transmit power process 700 for nodes within a mobile mesh network. The process starts (block 702) by waiting for a packet to be received (block 704). If this is not a decrement packet (block 706), the process resets. If it is a decrement packet, the current value of pwrdec on this node is compared to the suggested new value (comparison 708). If they're the same, no action is taken. If they are different, the new powdec is saved as the current pwrdec (block 710), and the new value is applied to the power levels (block 712) for packets that get dynamic power adjustment.

Embodiments are also directed to a node that controls dynamic transmit power in a mesh network, the mesh network including a plurality of other nodes, the node comprising a receiver, transmitter, and a processor configured for performing any or all of the above steps and/or portions thereof. FIG. 4 schematically illustrates node A 410 including such a processor 490. Processor 490 is exemplary and may be included in any of the nodes in any of the mesh networks mentioned above. In addition to including a receiver and transmitter, each node may include the processor 490 (or another type of processor) which is configured for performing any or all of the above steps and/or portions thereof. Instructions for performing any or all of the above method steps and/or portions thereof are stored in memory and are executable by each of the node processors such as node A's processor 490.

Any or all of the steps in the mesh protocol mentioned in any of the embodiments above may be implemented as software module(s) for execution by at least one processor, such as processor 490, in a node, computer, or other machine.

Although embodiments are described above with reference to a mobile mesh network, a mesh network of any type may utilize the advantages of the configurations and embodiments described above. For example, the mesh network may be a fixed-location mesh network or a wireless mesh network.

Although embodiments are also described above with reference to a beacon transmitted at full power, a beacon may alternatively be transmitted at other power levels as long as it is still able to be analyzed for its SNR and may therefore utilize the advantages of the configurations and embodiments described above.

Although embodiments are further described above with reference to a "decrement" being sent by the receiver to the transmitter when the saved power level adjustment changes in order to update a transmitter's transmission power level, an "increment" may alternatively be sent by the receiver to the transmitter when suitable conditions (or conditions complementary or converse to those that warrant a decrement) are satisfied and may therefore utilize the advantages of the configurations and embodiments described above.

More generally, even though the present disclosure and exemplary embodiments are described above with reference to the examples according to the accompanying drawings, it is to be understood that they are not restricted thereto. Rather, it is apparent to those skilled in the art that the disclosed embodiments can be modified in many ways without departing from the scope of the disclosure herein. Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

The invention claimed is:

1. A method for controlling dynamic transmit power in a mesh network, the mesh network comprising a plurality of nodes, the method comprising:
   (a) receiving a packet at a receiver of a first one of the nodes, the received packet sent from a transmitter of a second one of the nodes;
   (b) determining whether the received packet is a beacon packet;
   (c) determining a signal-to-noise ratio (SNR) of the received packet, when the received packet is determined to be a beacon packet;
   (d) comparing the SNR to a predetermined range;
   (e) determining whether the SNR falls within or outside the predetermined range based on the SNR comparison;
   (f) determining, by the receiver, a transmit power level adjustment value, when the SNR is determined to fall outside the predetermined range;
   (g) sending, via the receiver, the transmit power level adjustment value to the transmitter;
   (h) adjusting, at the transmitter, a transmit power level based on the transmit power level adjustment value, wherein the adjusted transmit power level is used by the transmitter for transmitting non-beacon packets; and
   (i) determining a frequency band to be used by the transmitter for transmitting the non-beacon packets, wherein determining the frequency band is based on at least one criteria selected from a group consisting of the adjusted transmit power level, the transmit power level adjustment value, the SNR comparison, and combinations thereof.

2. The method of claim 1, wherein at least one of steps (b)-(e) is performed by the receiver.

3. The method of claim 1, wherein the beacon packet is transmitted at full power.

4. The method of claim 1, wherein the SNR is a current SNR and is added to a previous SNR exponential moving average based on a previous SNR to create a current SNR exponential moving average, and wherein the SNR comparison utilizes the current SNR exponential moving average.

5. The method of claim 4, further comprising providing an SNR report based on the current SNR to a process implemented in the mesh network when a change in SNR (ΔSNR) from the previous SNR to the current SNR is greater than or equal to a decibel threshold.

6. The method of claim 5, wherein the process implemented in the mesh network is utilized in determining the transmit power level adjustment value.

7. The method of claim 6, wherein the process implemented in the mesh network utilizes a low SNR limit, a high SNR limit, and either the ΔSNR or both the previous SNR and the current SNR.

8. A system that controls dynamic transmit power in a mesh network, the mesh network comprising a plurality of nodes, the system comprising:
 a receiver of a first one of the nodes;
 a transmitter of a second one of the nodes; and
 a plurality of processors configured for:
  (a) receiving a packet at the receiver, the received packet sent from the transmitter;
  (b) determining whether the received packet is a beacon packet;
  (c) determining a signal-to-noise ratio (SNR) of the received packet, when the received packet is determined to be a beacon packet;
  (d) comparing the SNR to a predetermined range;
  (e) determining whether the SNR falls within or outside the predetermined range based on the SNR comparison;
  (f) determining, by the receiver, a transmit power level adjustment value, when the SNR is determined to fall outside the predetermined range;
  (g) sending, via the receiver, the transmit power level adjustment value to the transmitter;
  (h) adjusting, at the transmitter, a transmit power level based on the transmit power level adjustment value, wherein the adjusted transmit power level is used by the transmitter for transmitting non-beacon packets; and
  (i) determining a frequency band to be used by the transmitter for transmitting the non-beacon packets, wherein determining the frequency band is based on at least one criteria selected from a group consisting of the adjusted transmit power level, the transmit power level adjustment value, the SNR comparison, and combinations thereof.

9. The system of claim 8, wherein at least one of steps (b)-(e) is performed by the receiver.

10. The system of claim 8, wherein the beacon packet is transmitted at full power.

11. The system of claim 8, wherein the SNR is a current SNR and is added to a previous SNR exponential moving average based on a previous SNR to create a current SNR exponential moving average, and wherein the SNR comparison utilizes the current SNR exponential moving average.

12. The system of claim 11, wherein the processor is further configured for providing an SNR report based on the current SNR to a process implemented in the mesh network when a change in SNR (ΔSNR) from the previous SNR to the current SNR is greater than or equal to a decibel threshold.

13. The system of claim 12, wherein the process implemented in the mesh network is utilized in determining the transmit power level adjustment value.

14. The system of claim 13, wherein the process implemented in the mesh network utilizes a low SNR limit, a high SNR limit, and either the ΔSNR or both the previous SNR and the current SNR.

15. A method for controlling dynamic transmit power in a mesh network, the mesh network comprising a plurality of nodes, the method comprising:
 (a) receiving a packet at a receiver of a first one of the nodes, the received packet sent from a transmitter of a second one of the nodes;
 (b) determining whether the received packet is a beacon packet;
 (c) determining a signal-to-noise ratio (SNR) of the received packet, when the received packet is determined to be a beacon packet;
 (d) comparing the SNR to a predetermined range;
 (e) determining whether the SNR falls within or outside the predetermined range based on the SNR comparison;
 (f) determining, by the receiver, a transmit power level adjustment value, when the SNR is determined to fall outside the predetermined range;
 (g) sending, via the receiver, the transmit power level adjustment value to the transmitter;
 (h) adjusting, at the transmitter, a transmit power level based on the transmit power level adjustment value, wherein the adjusted transmit power level is used by the transmitter for transmitting non-beacon packets; and
 (i) determining a frequency band to be used by the transmitter for transmitting the non-beacon packets, wherein determining the frequency band is based on at least one criteria selected from a group consisting of the adjusted transmit power level, the transmit power level adjustment value, and combinations thereof.

16. A system that controls dynamic transmit power in a mesh network, the mesh network comprising a plurality of nodes, the system comprising:
 a receiver of a first one of the nodes;
 a transmitter of a second one of the nodes; and
 a plurality of processors configured for:
  (a) receiving a packet at the receiver, the received packet sent from the transmitter;
  (b) determining whether the received packet is a beacon packet;
  (c) determining a signal-to-noise ratio (SNR) of the received packet, when the received packet is determined to be a beacon packet;
  (d) comparing the SNR to a predetermined range;
  (e) determining whether the SNR falls within or outside the predetermined range based on the SNR comparison;
  (f) determining, by the receiver, a transmit power level adjustment value, when the SNR is determined to fall outside the predetermined range;
  (g) sending, via the receiver, the transmit power level adjustment value to the transmitter;
  (h) adjusting, at the transmitter, a transmit power level based on the transmit power level adjustment value, wherein the adjusted transmit power level is used by the transmitter for transmitting non-beacon packets; and
  (i) determining a frequency band to be used by the transmitter for transmitting the non-beacon packets, wherein determining the frequency band is based on at least one criteria selected from a group consisting of the adjusted transmit power level, the transmit power level adjustment value, and combinations thereof.

* * * * *